United States Patent [19]

Wilder

[11] Patent Number: 4,593,940
[45] Date of Patent: Jun. 10, 1986

[54] FLANGE ASSEMBLY FOR HYDRAULIC POWER SYSTEMS

[76] Inventor: Don R. Wilder, 1367 W. Ninth St., Upland, Calif. 91786

[21] Appl. No.: 489,780

[22] Filed: Apr. 29, 1983

[51] Int. Cl.$^4$ ............................................. F16L 5/00
[52] U.S. Cl. ................................... 285/158; 285/341
[58] Field of Search ............ 285/158, 341, 354, 189, 285/192, 159, 160, 161, 349, 363

[56] References Cited

U.S. PATENT DOCUMENTS

| | | | |
|---|---|---|---|
| 1,955,832 | 4/1934 | Raybould | 285/341 |
| 2,561,887 | 7/1951 | Risley | 285/341 |
| 2,826,436 | 3/1958 | Hupp et al. | 285/158 |
| 3,649,054 | 3/1972 | McClenan | 285/158 |

Primary Examiner—Dave W. Arola
Attorney, Agent, or Firm—Peter L. Klempay

[57] ABSTRACT

A flange assembly for connecting a pipe to a tank at an access opening through a wall thereof includes an externally threaded cylindrical portion having an internal annular recess, a compressible sealing member received in the recess, a cap threaded into the portion and engaging the sealing member, and a flange portion with a shallow annular recess of greater diameter than that of the access opening which carries an O-ring for sealing between the wall and the flange.

3 Claims, 3 Drawing Figures

FLANGE ASSEMBLY FOR HYDRAULIC POWER SYSTEMS

The present invention pertains to pipe flanges and, more particularly, to pipe flange assemblies utilized in hydraulic power systems.

BACKGROUND OF THE INVENTION

A typical hydraulic power supply system includes one or more pumps drawing hydraulic fluid from a reservoir or sump, one or more hydraulic motors, which may be either rotary or linear, which are operated by the hydraulic fluid through suitable regulating and control valves, and piping interconnecting the components of the system. In such a typical system there are one or more supply pipes for withdrawing hydraulic fluid from the reservoir or sump and one or more return pipes also connected to the reservoir of sump. When the system is initially fabricated, appropriate fittings are provided on the tank which serves as the sump for the supply and return lines. If alterations are subsequently made in the hydraulic power circuit, additional supply and/or return lines may be required to be connected to the reservoir tank. It will be appreciated that the connection of additional lines may be a relatively complex and expensive operation, frequently involving welding of appropriate fittings to the tank wall.

It is the primary object of the present invention to provide an improved pipe connecting flange for use in hydraulic power systems.

It is also an object of the present invention to provide a pipe connection for hydraulic power systems which may be installed on an existing reservoir or sump tank without requiring welding or other complex operations.

BRIEF SUMMARY OF THE INVENTION

The above and other objects of the invention which will become apparent hereinafter are achieved by the provision of a pipe connecting flange for a hydraulic system which flange includes an enlarged base portion adapted to be bolted to the tank wall in place of a preexisting access cover, seal means carried by the base for sealingly engaging the wall surface, an externally threaded cylindrical member integrally with and projecting from the base portion, an internally threaded annular cap mating with the cylindrical member, and a compressable sealing ring carried between the cap and the cylindrical member, the cap and the cylindrical member providing an opening for reception of a pipe.

For a more complete understanding of the invention and the objects and advantages thereof reference should be had to the accompanying drawing and the following detailed description wherein a preferred embodiment of the invention is shown and described.

DETAILED DESCRIPTION OF THE PREFERRED EMBODIMENT

Figure 1:
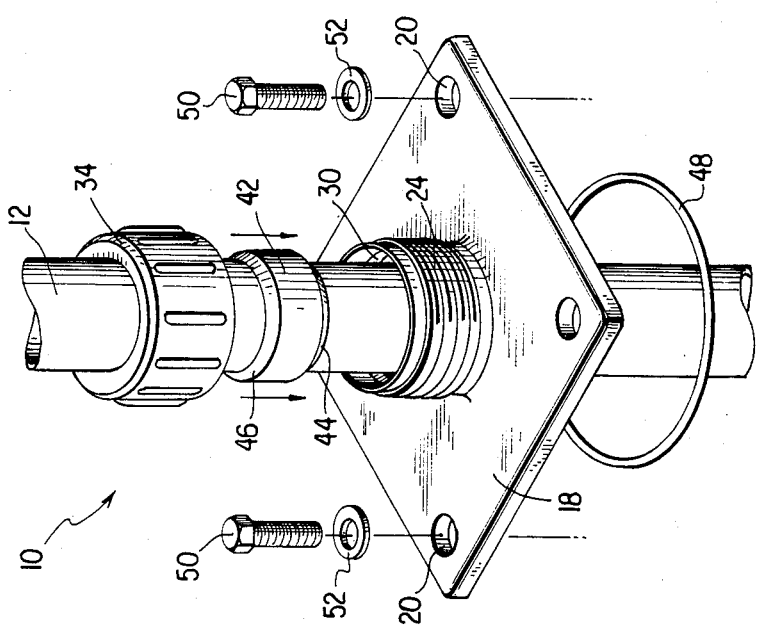
FIG. 1 is an exploded, isometric view of the pipe connector flange of the present invention.
Figure 2:
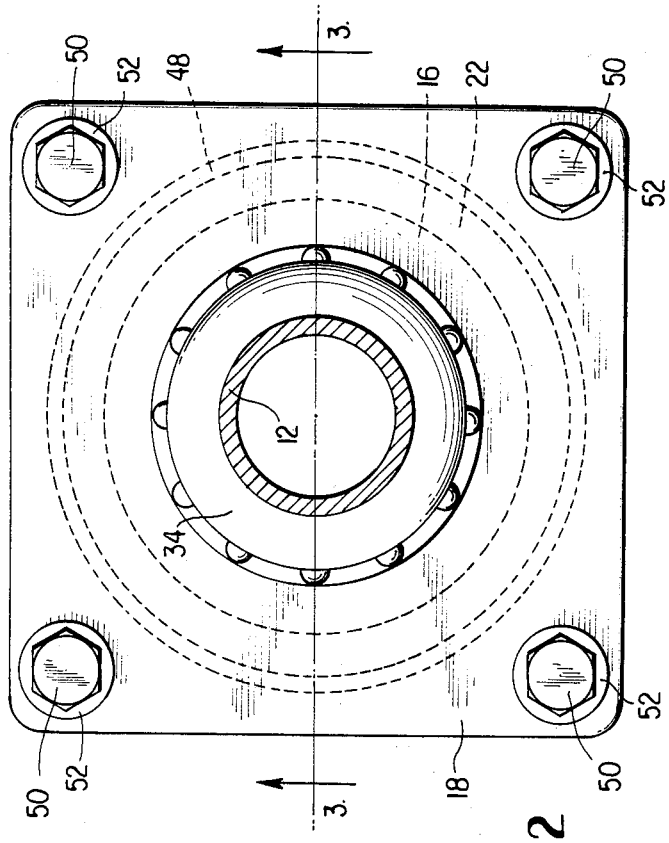
FIG. 2 is a top view thereof.
Figure 3:
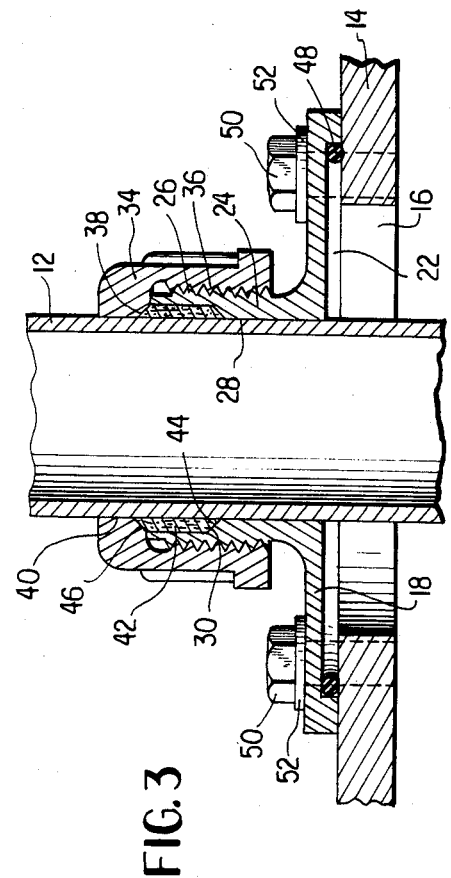
FIG. 3 is a transverse sectional view taken on the line 3—3 of FIG. 2.

The flange assembly of the present invention, designated generally by the reference numeral 10, is designed to connect a pipe 12 which may be a supply or return line of a hydraulic power system to a tank, the wall portion of which is designated by the numeral 14, which serves as the sump or reservoir of the system. The flange assembly 10 is adapted to be used in connecting the pipe 12 at a preexisting opening 16 in the tank wall 14, which opening 16 is of a substaintially greater diameter than that of the pipe 12 and may, for example, serve as an access opening and which, in the absence of the flange assembly 10, would be covered by a suitable access plate (not shown). The base portion 18 of the flange assembly 10 is of generally square configuration in plan; having bolt holes 20 adjacent to the corners thereof and, on the underside thereof, a shallow annular recess 22 the diameter of which is greater than that of the access hole 16. Projecting upwardly from the outer or opposite face of the base portion 18 is a cylindrical portion 24 having threads 26 on its exterior and having a through bore 28. As can be seen most clearly from FIG. 3, the uppermost portion of the tubular projection 28 is of reduced thickness providing an annular recess 30 with a cylindrical side wall and frustroconical base portion tapering toward the lower end thereof. The assembly 10 also includes a cap member 34 having internal pipe threads 36 which mate with the threads 26 of the cylindrical portion. The inner face of the cap 34 is provided with a frustroconical surface 38 tapering upwardly toward a through bore 40. A cylindrical sealing ring 42 having frustroconical lower and upper surfaces 44, 46 of complementary configuration to the surfaces 32, 38, respectively, is received in the annular recess 30 of the base cylindrical portion 24. Completing the description of the pipe flange aasembly, an O-ring 48 is provided in the annular recess 22 of the base portion 18 and bolts 50 with sealing washers 52 are provided for connecting the assembly to the tank wall.

Connection of the pipe 12 to the tank involves bolting of the base portion 18 to the flange assembly to the tank wall 14 by means of the bolts and washers 52 with O-ring 48 being positioned within the recess 22 and, upon tightening of the bolts 50, compressed sufficiently to form a fluid-tight seal between the tank wall 14 and the flange base portion 18. The pipe 12 is then inserted in the bore 28 with the compressable sleeve 42 positioned thereon and received within the annular recess 30. Cap member 34 is then threaded onto the cylindrical portion 24 and tightened sufficiently to compress the sleeve 42 forming a fluid-tight seal around the pipe and serving to clamp the pipe in place.

It will be understood that, while a preferred embodiment of the invention has been shown and described, the invention is not limited therto or therby. Rather, reference should be had to the appended claims in determining the true scope of the invention.

I claim:

1. A flange assembly adapted for connecting a hydraulic fluid supply or return pipe to a reservoir having a wall portion and an access opening therethrough comprising:

a unitary flange member having a cylindrical portion with a through bore, said cylindrical portion being externally threaded and having an internal annular recess extending from one end thereof and a flange integral with and extending outwardly from the other end of said cylindrical portion, the face of said flange opposite said cylindrical portion having a shallow annular recess extending radially from said through bore and of greater diameter than that of said access opening, said flange having bolt holes radially outwardly of said recess;

a cap member having a through bore and being internally threaded to mate with said cylindrical portion;

a compressible sleeve receiveable in said internal annular recess of said cylindrical portion and engageable by said member; and an O-ring receiveable in said shallow annular recess of said flange.

2. The flange assembly of claim 1 further characterized in that the inner end of said internal annular recess of said cylindrical member is of frustroconical configuration tapering inwardly, said cap member has a frustroconical portion adjacent said through bore therein and the ends of said sleeve are of complementary configuration thereto.

3. The improvement in a hydraulic power supply system having a reservoir tank with an access opening and supply and return pipes extending from the reservoir tank comprising:

a flange assembly adapted for connecting an additional supply or return pipe to said reservoir tank through the access opening therein; said flange assembly including a unitary flange member having a cylindrical portion with a through bore, said cylindrical portion being externally threaded and having an internal annular recess extending from one end thereof and a flange integral with and extending outwardly from the other end thereof, the face of said flange opposite said cylindrical portion having a shallow annular recess extending radially from said through bore and of greater diameter than that of said access opening, said flange having bolt holes radially outwardly of said recess;

a cap member having a through bore and being internally threaded fro engagement with the threads of said cylindrical portion;

a compressible sleeve receiveable in said internal annular recess of said cylindrical portion and engageable by said member; and an O-ring receiveable in said internal annular recess of said flange at the circumference thereof.

* * * * *